J. B. FOSTER.
DIATORIC OR PINLESS TOOTH.
APPLICATION FILED AUG. 14, 1920.

1,386,463.

Patented Aug. 2, 1921.

J. B. Foster
INVENTOR

BY Victor J. Evans
ATTORNEY

WITNESS J. W. Ely

UNITED STATES PATENT OFFICE.

JOSEPH B. FOSTER, OF ROANOKE, VIRGINIA.

DIATORIC OR PINLESS TOOTH.

1,386,463. Specification of Letters Patent. Patented Aug. 2, 1921.

Application filed August 14, 1920. Serial No. 403,463.

*To all whom it may concern:*

Be it known that I, JOSEPH B. FOSTER, a citizen of the United States, residing at Roanoke, in the county of Roanoke and State of Virginia, have invented new and useful Improvements in Diatoric or Pinless Teeth, of which the following is a specification.

This invention relates to improvements in diatoric or pinless teeth and the principal object is to provide a tooth of this nature which shall not be subject to the easy fracture to which those with dove-tail cavities and dove tail tenons or other angularly shouldered securing means are subject.

With this and incidental objects in view the invention consists in certain novel construction and combination and arrangements of parts, the essential features of which are fully set forth in the following description and claims and which are shown in the accompanying drawings consisting of one sheet in which:—

Like characters of reference refer to like parts in all views.

Figure 1:
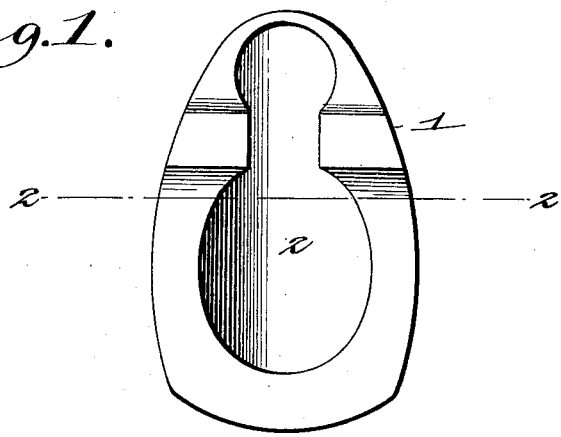
Figure 1, is a rear elevation of my improved diatoric tooth.
Figure 2:
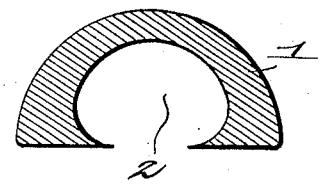
Fig. 2, is a section taken on line 2—2 of Fig. 1.
Figure 3:
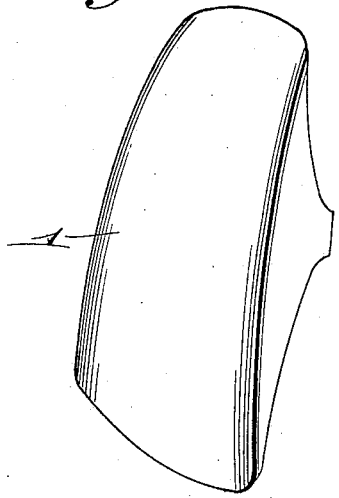
Fig. 3 is a perspective view showing the front of the tooth.
Figure 4:
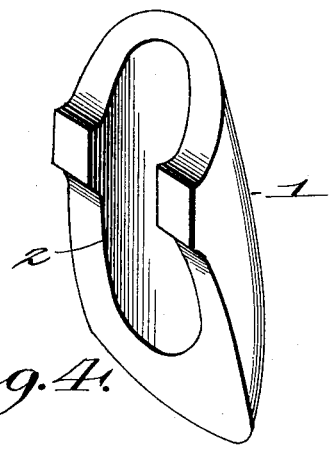
Fig. 4 is a perspective view showing the rear of the tooth.

This invention contemplates the providing of a diatoric or pinless tooth for use in making false sets of teeth and in which the securing mortise shall be curvilinear so as not to present sharp angles to the hard rubber or other plate used. At present, teeth of this kind are provided with either angular apertures or mortises into which the hard rubber is run or with angular tenons about which the rubber or plate is fastened. These angular securing means have been found troublesome in that the tooth is very apt to fracture at the angular points.

Referring more particularly to the drawing, 1 represents an artificial tooth which is provided with a curved opening 2 at its rear side, said opening extending from the gum line down to within a short distance of the cutting edge of the tooth, the horizontal axis of the opening being greater toward the cutting edge so as to firmly attach the tooth to the plate.

While I have described what I deem to be the most desirable embodiment of my invention, it is obvious that many of the details may be varied without in any way departing from the spirit of my invention and I therefore do not limit myself to the exact details of construction herein set forth nor to anything less than the whole of my invention limited only by the appended claims.

What I claim as new is:—

1. A tooth for plates having a curvilinear aperture formed in its rear surface and extending from the cervical end to a point near the cutting edge of the tooth as and for the purpose set forth.

2. A tooth for plates having a curvilinear aperture formed in its rear surface and extending from the cervical end to a point near the cutting edge of the tooth, and the horizontal axis of said aperture being greater at one point than it is at another point which is nearer the cervical end of the tooth.

In testimony whereof I have affixed my signature.

JOSEPH B. FOSTER.